United States Patent [19]

Ward

[11] 4,181,551
[45] Jan. 1, 1980

[54] METHOD OF PRODUCING STAMPED PLASTIC ARTICLES

[75] Inventor: Lowell G. Ward, Mendham, N.J.

[73] Assignee: Allied Chemical Corporation, Morris Township, Morris County, N.J.

[21] Appl. No.: 914,657

[22] Filed: Jun. 12, 1978

[51] Int. Cl.² .......................... B32B 31/00; B31F 1/00
[52] U.S. Cl. ..................................... 156/199; 156/222; 156/245; 156/251; 156/253; 156/269; 156/270; 156/299; 156/322; 264/163
[58] Field of Search ............... 156/196, 199, 221, 222, 156/242, 245, 251, 253, 265, 219, 499, 244.19, 300, 302, 269, 270, 299; 264/163, 284, 293, 322

[56] References Cited

U.S. PATENT DOCUMENTS

| | | | |
|---|---|---|---|
| 2,156,871 | 5/1939 | Rittenhouse | 264/293 |
| 3,185,614 | 5/1965 | Van Hartesveldt et al. | 156/311 |
| 3,621,092 | 11/1971 | Hofer | 264/322 |
| 3,920,879 | 11/1975 | Segal et al. | 156/306 |
| 4,044,188 | 8/1977 | Segal | 156/244.25 |

Primary Examiner—William A. Powell
Assistant Examiner—L. E. Rodgers
Attorney, Agent, or Firm—Robert J. North; Patrick L. Henry

[57] ABSTRACT

Disclosed is a method of continuously carrying thermoplastic sheets through an oven maintained at a temperature above the melting point of the thermoplastic and to a stamping press wherein the sheet can be stamped into a shaped article. No manual transporting is needed from the oven to the press.

14 Claims, 3 Drawing Figures

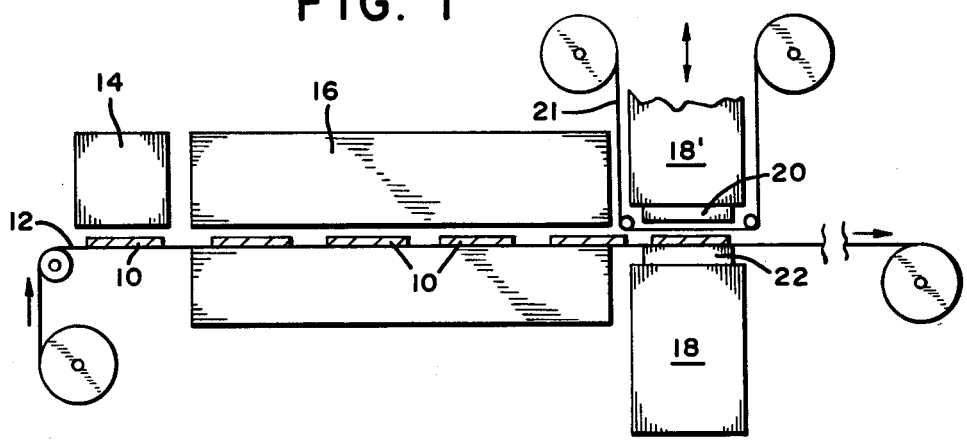
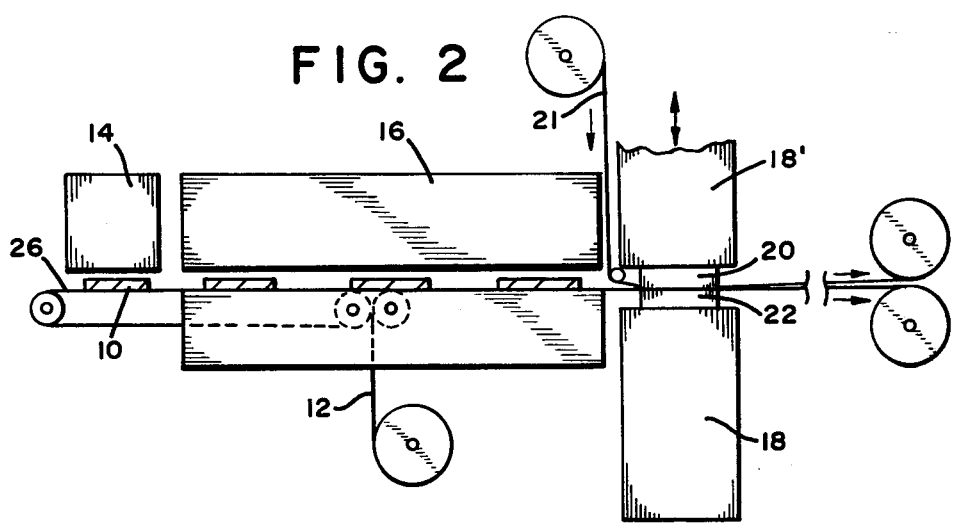
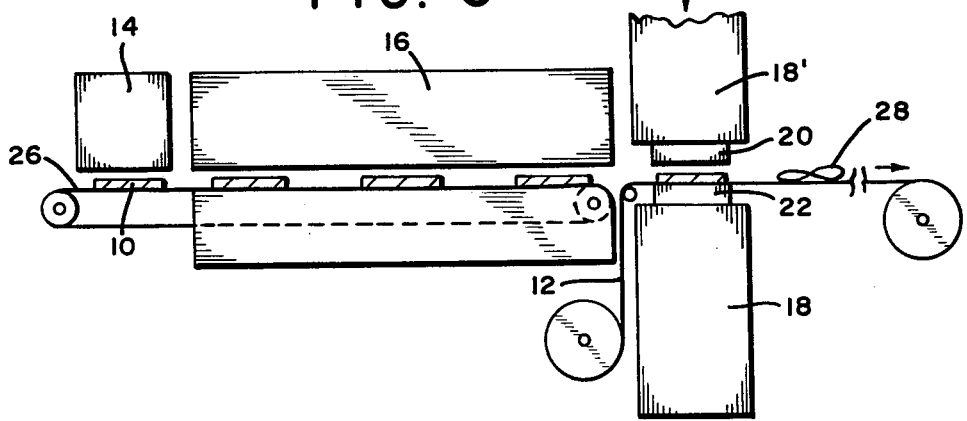

METHOD OF PRODUCING STAMPED PLASTIC ARTICLES

BACKGROUND OF THE INVENTION

1. Field of the Invention

This invention relates to a method of transporting a hot molten thermoplastic sheet through an oven to a stamping press for shaping.

2. Description of the Prior Art

It is known that many thermoplastic polymers can be formed into shaped articles by various sheet metal forming techniques such as deep drawing, stretch forming, stamping, forging etc. These forming processes are economically very attractive because it is possible to achieve rapid production rates, e.g., rates that exceed one item a minute.

Generally in this art, a thermoplastic sheet, reinforced with a fiber glass mat, woven cloth, or woven roving is preheated in an oven to above the softening point of the resin. The heated sheet, or blank, is manually transferred to a stamping press or compression molding press containing a matched metal die and stamped into a shaped article. The article is then ejected from the die and removed from the press by hand or mechanical means. Although such a process has met with limited commercial success, it still suffers from several disadvantages.

One such disadvantage is the fact that the heated thermoplastic sheet must be manually transferred from the oven to the stamping press.

Manual transfer is not desirable for a number of reasons. Principal among these is the possibility of deforming the parts of the sheet in contact with the operators hands; the cooling of the sheet at these points of contact; the considerable time required to pick up the sheet, move it to the press and deposit it on the die; and the difficulty of positioning the heated blank in the same location each time. Also, the fluid nature of many thermoplastic polymers causes difficulties in transferring, without support, sheets containing low levels of reinforcing material.

SUMMARY OF THE INVENTION

In accordance with the present invention there is provided a method of conveying hot limp thermoplastic composite sheets through an oven, to a press for shaping. The method comprises: heating the thermoplastic sheets in an oven maintained at a temperature above the melting point but below the decomposition temperature of the thermoplastic resin; providing a conveying surface comprised of an indefinite length of a web, hereinafter referred to as veil comprised of a material such as glass fiber to support the sheet and carry them into position in a press between two components of a die; stopping movement of the veil when a thermoplastic sheet is positioned between said components; actuating at least one component of the die to shape the sheet and veil, thereby bonding the veil to the resulting shaped article and thereby separating at least a substantial portion of the veil which supported the sheet, from the remainder of the veil; and, opening the press and removing the shaped article. Optionally a second veil of like material as the supporting veil can be positioned above the sheets so that after shaping both the top surface as well as the bottom surface of the shaped article will contain a veil.

In one embodiment of the present invention a veil of glass fibers is used to receive the sheets from a conventional metal link conveyor belt immediately at the opening of the oven where the hot sheets exit. In another embodiment the veil receives the hot sheets from said metal link belt inside the oven at a point where the sheets are still in a rigid enough state that the transfer from the belt to the veil will not cause deformation of the thermoplastic sheet.

In the preferred embodiment of the present invention the veil is used to receive the sheets before entering the oven wherein the sheets are conveyed through the entire process while supported by the veil. Preferably, in all embodiments, each step is indexed with respect to the previous step.

BRIEF DESCRIPTION OF THE DRAWINGS

FIG. 1 illustrates an embodiment of the present invention wherein thermoplastic sheets are continuously carried through an oven on a continuous veil, to a stamping press, and optionally to a finishing area.

FIG. 2 illustrates an embodiment of the present invention wherein thermoplastic sheets are continuously transferred from a metal link belt while still in an oven to a continuously moving veil which carries the sheet to a stamping press and optionally to a finishing area.

FIG. 3 illustrates another embodiment of the present invention wherein thermoplastic sheets are continuously transferred from a metal link belt after immediately exiting from an oven to a continuously moving veil which carries the sheet to a stamping press and optionally to a finishing area.

Any of these embodiments can include a second veil applied to the top surface of the thermoplastic sheets in order to preserve symmetry as illustrated in FIGS. 1 and 2.

DETAILED DESCRIPTION OF THE INVENTION

Suitable thermoplastic materials which may be employed in the present invention comprise a wide range of polymer compositions. Non-limiting examples include olefinic polymers such as polyethylene, polypropylene and copolymers and terpolymers thereof, e.g. copolymers of ethylene and ethyl acrylate; vinyl polymers comprising one or more of the following monomers: vinyl aryls such as styrene, o-phenylstyrene, m-phenylstyrene, p-phenylstyrene, o-methylstyrene, m-methylstyrene, p-phenylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene bromide, and the like; vinyl esters such as vinyl acetate, vinyl propionate, vinyl butyrate, vinyl chloroacetate, vinyl benzoate, and the like; polycarbonates, that is, thermoplastics containing the following repeating units:

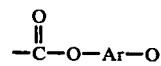

wherein Ar is the residue of an aromatic dihydric phenol; cellulose compounds, such as cellulose acetate, cellulose triacetate, cellulose acetate butyrate, cellulose propionate, ethyl cellulose, and the like; polyamides, polyesters such as polyethylene terepththalate, polyethylene isophthalate, poly (ethylene-2,7-naphthamate), polybutylene terephthalate, polypropylene terephthalate, copolymers thereof and the like; chlorinated polyethylene, chlorinated polyvinyl chloride, polyfluoroethylene, polytrifluorochloroethylene, polyhexafluoropropylene, copolymers thereof, such as copolymers of vinylidene fluoride and trifluorochloroethylene, and the like, as well as mixtures of any of the above.

Also suitable for use herein are polyurethane polymers, polysulfone polymers, polyacetal polymers, halogenated olefins, and phenoxy polymers. Included in the term "polymer" are blends of two or more polymeric materials. Also contemplated within the term "polymer" are the metallic salts of those polymers or blends thereof which contain free carboxylic acid groups. Non-limiting examples of such polymers include ethylene-acrylic acid copolymers and ethylene-methacrylic acid copolymers. Illustrative of the metals which may be used to provide the salts of such carboxylic acid polymers are the mono-, di-, and tri- valent metals such as sodium, calcium and aluminum.

Preferred thermoplastic polymers are polyamides, polyolefins, and polyesters; more preferred are polyamides, and specific polyolefins such as polypropylene, polyethylene and the polyesters, polybutylene terephthalate and polyethylene terephthalate; most preferred are polyamides. Non-limiting examples of such polyamides are: (a) those prepared by the polymerization of lactams, preferably epsilon-caprolactam; (b) those prepared by the condensation of a diamine with a dibasic acid, preferably the condensation of hexamethylene diamine with sebacic acid; (c) those prepared by self-condensation of amino acids, preferably self-condensation of 11-aminoundecanoic acid; and (d) those based on polymerized vegetable oil acids, or random, block, or graft interpolymers consisting of two or more of these polyamides. Preferred are those obtained by the polymerization of epsilon-caprolactam. These include polycaprolactams containing (a) carboxyl groups attached to both ends of the polymer chain; (b) a carboxyl group attached to one end and an acetamide group attached to the other end of the chain; (c) amino groups attached to both ends of the polymer chain; and (d) a carboxyl group attached to one end and an amino group attached to the other end of the polymer chain.

Preferably the thermoplastic sheets of the present invention are reinforced with long glass fiber, short glass fiber, particulate fillers or plate-like fillers such as high aspect ratio mica. By high aspect impact ratio we mean the average diameter of the particle divided by its thickness is at least 20:1, preferably at least about 40:1, and more preferably about 50:1 to 200:1.

The term "long glass fibers" as used herein is intended to be employed in a broad sense to include glass mat, as well as individual continuous fibers, more particularly known as filaments, which have a length greater than about 1 inch; groups of twisted strands, more particular known as yarn or thread; untwisted or slightly twisted groups of strands, more particularly known as roving; discontinuous lengths of fibers, more particularly known as staple fibers, which can be spun into threads, twisted strands, roving or yarn. Preferred is glass fiber strand mat in the form of strands or bundles which are at least about 1 inch to continuous in length. This mat can be woven or nonwoven and if nonwoven, the strands or fibers are held together by resinous adhesive binders, mechanical interaction or by "needle punching." If woven, the strands or fibers are held together by mechanical interaction of the patterned weblike structure. In one commercially available form of strand mat, the long strands are chopped strands which are 2 to 20 inches in length, preferably 3 to 10 inches.

The strands are composed of a plurality of fibers usually numbering 2 to 400, preferably 5 to 120. The individual fiber diameter ranges from about 0.0002 to 0.001 inch, preferably 0.0003 to 09.0008 inch and the strand diameter measures at least 0.001 inch and preferably 0.0015 to 0.004 inch in diameter.

It is also within the scope of the present invention that other reinforcing fillers can be used alone or in combination with glass fibers. For example, the mica or glass reinforced thermoplastic of choice may also contain particulate fillers. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polymer. Examples of fillers included in these categories are alumina, aluminum hydrates, feldspar, asbestos, talc, calcium carbonates, clay, carbon black, quartz, novaculite, and other forms of silica, kaolinite, bentonite, garnet, saponite, beidellite, calcium oxide, wollastonite, calcium hydroxide, etc., as well as short reinforcing fibers (less than 2 inch in length) such as glass, metal, carbon, jute, hemp or sisal fibers. The fillers listed above are given as examples only and are not intended as a limitation on fillers that can be utilized in this invention. The fillers may be coated with sizing agents, coupling agent, adhesion promoters, wetting agents and the like, as are known to those skilled in the art. The precise amount of other reinforcing filler, can be determined by routine experimentation by those skilled in the art for any particular desired property or set of properties.

Other conventionally known additives of value in thermoplastic sheet formulations are also suitable for use herein. Non-limiting examples of such additives include antistatic agents, plasticizers, lubricants, nucleating agents, impact modifiers, colorants, heat and light stabilizers, and other similar processing aids and adjuvants.

The long glass fiber strand, mica and other fillers described herein can be treated with a coupling agent which has the ability to enchance the bonding of the thermoplastic polymer with the chopped strand mat. The coupling agent can be applied to the individual fibers or other fillers during forming and/or to the strands in the mat. Non-limiting examples of such coupling agents suitable for use herein include chromic chloride complexes as well as various silane and siloxane materials such as hydrolyzable vinyl, alkyl, amino, methacryloxy, epoxy, and glycidoxy silanes as well as their hydrolysis products and polymers of the hydrolysis products and mixtures thereof. Preferred are the silanes and siloxanes; more preferred are the silanes. Also suitable, particularly for use with glass fibers are one or more of the various types of sizing agents or coatings which are employed by those in the art. These sizing agents are usually multicomponent compositions which will comprise one or more lubricants, emulsifying agent, coupling agents, pH adjusters, film forming synthetic binders, antistatic agents and/or wetting agents and the like. Preferred are the aforementioned coupling agents.

The thermoplastic sheets suitable for use herein can be prepared by any conventionally acceptable means employed in the art such as by blending the filler or fillers and additives with a liquid thermoplastic resin (melted resin or solution or dispersion of the resin) or dry blending with resin pellets or the like. The sheet can then be formed by extruding, calendering or casting the blend into a sheet. Preferably, the blend is dry blended and fed to an extruder wherein it is extruded into a sheet having a thickness of, for example, about 5 to 250 mils, preferably 10 to 125 mils and are cut into blanks of desired size.

Preferrably the sheet is a multilayered glass mat reinforced laminate structure such as those taught in U.S. Pat. No. 4,044,188; U.S. Pat. No. 3,920,879 and U.S. patent application Ser. No. 889,573, filed Mar. 23, 1978, all of which are incorporated herein by reference. Such laminates can be prepared by any conventional means. For example, in the case of a two ply structure, two plies of thermoplastic sheeting are extruded or similarly produced; glass mat or its equivalent is then fed between the two plies; the proper combination of heat and pressure (supplied by laminating rolls or the like) is then used to fuse and laminate the two sheets and the glass fiber web, mat, or the like together into an integral sheet construction. The sheets then can be cut to any desirable size for subsequent shaping.

Generally the thermoplastic sheet is comprised of about 25 to 65 wt.%, preferably about 40 to 60 wt.% of filler based on the total weight of the sheet. One preferred thermoplastic sheet is comprised of about 46 wt.% polycaprolactam and about 54 wt.% combined glass fiber and mineral filler.

The veil which is suitable for use as a carrying means herein is similar to the glass mat previously described except that the veil has a weight of about 0.1 to 0.25 ounces per square foot and is about 10 to 70 mils thick as opposed to the glass mat which can weight as much as 5 ounces per square foot and can be as much as 250 mils thick.

It will also be noted that the veil can also be comprised of materials other than glass fiber as long as the veil is of such a material that will maintain its chemical and physical integrity throughout the entire process. That is the veil is of a material having a melting point substantially higher than that of the thermoplastic composition it carries through or from the oven. In the case where polyamides are the thermoplastic material then glass fiber, carbon fiber or graphite fiber is preferred, more preferably glass fiber. Where a lower melting thermoplastic is carried through the oven then it will also be noted that the veil can be materials other than glass fiber such as non-woven nylon or polyester web.

In accordance with a preferred embodiment of the present invention as shown in FIG. 1, thermoplastic sheets 10 are deposited on a substantially continually moving fiber glass veil of indefinite length 12 either manually or by way of depositing means 14. The thermoplastic sheets are carried through an oven 16 which is maintained at a temperature greater than the melting temperature but lower than the decomposition temperature of the particular thermoplastic resin, in the case of nylon based materials, from generally about 300° to 350° C. The thermoplastic sheets are then carried by use of the continually moving veil from the oven to a stamping press 18 containing two components of a die such as a plug 20 and cavity 22, wherein the die is preferably a matched metal die. The thermoplastic sheet is stamped by operation of the ram portion 18' of the stamping press and the shaped article containing that portion of the veil outlining said sheet and on which the sheet rest is removed by any conventional method used in the art. For example conventional ejector pins can be used in the die to eject the shaped article whereupon the article can be either removed from the die area by hand, or it can be removed by way of a conventional mold sweep and swept onto a portion of the continually moving veil and carried downstream to a finishing area.

Optionally, a second veil 21 can be applied to the top surface of the sheets before stamping. The second veil, like the carrier veil 12 also becomes part of the shaped article and provides symmetry to the stamped article when required. The shaping process herein can include either molding or deforming.

It is also within the scope of this invention that a die can be designed such that during stamping the entire outline of the shaped article is not punched out of the veil but several supporting tabs remain in the veil which would be capable of supporting the shaped article after ejection and can carry the shaped article further downline to an area where the article can be removed from the veil and trimmed.

FIG. 2 shows an embodiment of the present invention wherein the thermoplastic sheets are deposited on a conventional metal link conveyor belt 26 which continuously carries the thermoplastic sheets into an oven 16 which is also maintained at a temperature above the melting temperature but below the decomposition temperature of the thermoplastic resin. The sheets are transferred while in the oven to a moving veil 12 at a point wherein the hot sheets are not yet in a limp state. By limp state is meant a physical state wherein the sheets are at elevated temperatures and lack firmness or rigidity and can be easily deformed if handled or transferred to another conveying means. Usually the temperature is about or greater than the melting temperature of the thermoplastic resin.

An optional veil of indefinite length 21 is also shown as well as the plug 20 and cavity 22 in a substantially closed position.

FIG. 3 shows an embodiment of the present invention similar to that shown in FIG. 2 with the exception that the thermoplastic sheets are transferred to a glass filter veil from the metal link conveyor belt immediately after exiting from the oven. This figure also shows the shaped article 28 being carried further down the line.

In each of the embodiments of the present invention each step is indexed in relation to the previous step so that the entire process can be substantially automated. Also, as in FIG. 1 or FIG. 2 herein, a second veil can be applied to the top surface of the thermoplastic sheets before shaping. The second veil also becomes part of the shaped article and provides symmetry to the shaped article when required. Further the press can be either a stamping press or a compression molding press although the stamping press is preferred.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

What is claimed is:

1. A method of conveying hot limp polyamide sheet compositions through an oven, to a press wherein the oven is maintained at a temperature above the melting point but below the decomposition temperature of the polyamide resin, which method comprises:
   (a) heating said polyamide sheets in an oven to a temperature from about the melting point to a temperature below the decomposition temperature of the polyamide so that the polyamide sheet is in a limp condition;
   (b) providing a conveying surface comprised of a glass fiber veil of indefinite length to support said polyamide sheets and convey same into position in a press between two components of a die;
   (c) stopping movement of said veil when a polyamide sheet is positioned between two components of said die;
   (d) actuating at least one component of said die to shape the sheet and veil thereby bonding said veil to the resulting shaped article, and separating at least a substantial portion of the veil which supported said sheet from the rest of the veil to form a composite shaped article; and
   (e) opening the press and removing the shaped article; performed in such a way that each step of the method is indexed to the previous step.

2. The method of claim 1 wherein the polyamide sheet composition is comprised of about 35 to 75 wt.% polycaprolactam and about 25 to 65 wt.% of long glass fiber and mineral filler.

3. The method of claim 2 wherein the long glass fiber is in the form of a glass mat.

4. The method of claim 1 wherein the die is a matched metal die.

5. The method of claim 1 wherein the entire section of the veil on which the polyamide sheet was resting is separated from the rest of the veil and becomes part of the shaped article.

6. The method of claim 1 wherein the shaped article is removed from the press by being automatically ejected upward and onto a remaining portion of the veil for conveyance to a finishing area.

7. The method of claim 1 wherein the press is a stamping press.

8. The method of claim 3 wherein the press is a stamping press.

9. A method of conveying hot limp thermoplastic sheet compositions through an oven, to a press wherein the oven is maintained at a temperature above the melting point but below the decomposition temperature of the thermoplastic resin, which method comprises:
   (a) heating said thermoplastic sheets in an oven to a temperature from about the melting point to a temperature below the decomposition temperature of the thermoplastic so that the thermoplastic is in a limp condition;
   (b) providing a conveying surface comprised of a veil of non-woven material having a melting point substantially higher than that of the thermoplastic and capable of maintaining its chemical and physical integrity throughout the entire method wherein said veil is of indefinite length to support said thermoplastic sheets and convey them into position in a press between two components of a die;
   (c) stopping movement of said veil when a thermoplastic sheet is positioned between two components of said die;
   (d) actuating at least one component of said die to shape the sheet and veil thereby bonding said veil to the resulting shaped article, and separating at least a substantial portion of the veil which supported said sheet from the rest of the veil to form a composite shaped article; and
   (e) opening the press and removing the shaped article; performed in such a way that each step of the method is indexed to the previous step.

10. The method of claim 9 wherein the thermoplastic is polyethylene.

11. The method of claim 10 wherein the veil is comprised of a non-woven web of nylon or polyester fibers.

12. The method of claim 8 wherein the die is a matched metal die.

13. The method of claim 9 wherein the entire section of the veil on which the thermoplastic sheet was resting is separated from the rest of the veil and becomes part of the shaped article.

14. The method of claim 9 wherein the shaped article is removed from the press by being automatically ejected upward and onto a remaining portion of the veil for conveyance to a finishing area.

* * * * *